United States Patent [19]

Roszhart

[11] Patent Number: 4,772,110

[45] Date of Patent: Sep. 20, 1988

[54] COOLED MIRROR WITH COMPENSATING BACKPLATE

[75] Inventor: Terry V. Roszhart, Ridgefield, Conn.

[73] Assignee: The Perkin-Elmer Corporation, Norwalk, Conn.

[21] Appl. No.: 913,803

[22] Filed: Sep. 30, 1986

Related U.S. Application Data

[63] Continuation of Ser. No. 761,714, Aug. 2, 1985, abandoned.

[51] Int. Cl.$^4$ .......................... G02B 5/08; G02B 7/18
[52] U.S. Cl. ..................................... 350/610; 350/608
[58] Field of Search ............... 350/610, 609, 608, 641, 350/162.23

[56] References Cited

U.S. PATENT DOCUMENTS

| | | | |
|---|---|---|---|
| 3,637,296 | 1/1972 | McLafferty et al. | 350/610 |
| 3,880,500 | 4/1975 | Kojabashian | 350/608 |
| 4,253,739 | 3/1981 | Carlson | 350/610 |
| 4,431,269 | 2/1984 | Barnes | 350/610 |
| 4,435,045 | 3/1984 | Fried | 350/607 |

Primary Examiner—Jon W. Henry
Attorney, Agent, or Firm—Thomas P. Murphy; Edwin T. Grimes; Paul A. Fattibene

[57] ABSTRACT

A cooled mirror with a compensating backplate which has an integral heat exchanger on the substrate. The substrate has a faceplate with an integral heat exchanger which is in the optical path of the incoming radiation and which is in same size and made of the same material as the backplate. The frontplate and backplate are symmetrically located on opposite sides of the substrate. Cooling fluid at the same pressure flows at the same rate through both the frontplate and the backplate. The optical surface, such as a mirror, can be located on the frontplate or both the frontplate and the backplate.

2 Claims, 1 Drawing Sheet

COOLED MIRROR WITH COMPENSATING BACKPLATE

This applicaiton is a continuation of application Ser. No. 761,714, filed 8/2/85 now abandoned.

BACKGROUND OF THE INVENTION

This invention pertains to cooled mirrors, and more particularly to cooled mirrors wherein the frontplate and backplate, with integral heat exchangers are of one material and the mirror substrate is of another material.

As the power in radiation beams has increased so too has the need to cool the mirrors used to redirect such high powered beams. Past solutions to the problem are ineffective for new systems with more stringent requirements or caused further problems of their own.

One approach has been to construct a mirror with an integral heat exchanger or with an attached heat exchanger of the same material as the mirror substrate. Such materials do not meet the simultaneous requirements for high conductivity in the heat exchanger and low thermal expansion in the substrate.

Another approach is to provide a heat exchanger on the active side of the mirror which is highly thermally, conductive but of a different material than the substrate. This provides a heat exchanger that can accommodate the high thermal loads. The drawback to this approach is the bimaterial effect caused by joining the two materials with different thermal coefficients of expansion. The different thermal coefficients of expansion of the two materials cause the assembly to bend when the ambient temperature changes.

In the cooled mirror disclosed in the present application the disadvantages of the prior art cooled mirrors are overcome by providing a novel heat exchanger configuration which both carries away unwanted heat produced by high power radiation and also compensates for the bimaterial bending encountered in other approaches.

BRIEF DESCRIPTION OF THE INVENTION

One of the objects of the present invention is to provide a mirror for high-power applications which can quickly and efficiently remove unwanted heat.

A further object of the present invention is to mitigate bending of the substrate caused by the joining of the dissimilar materials of the heat exchangers and the substrate.

A still further object of the invention is to provide a cooled mirror which exhibits low thermal gradients between the heat exchanger in the faceplate and the substrate.

A still further object of the invention is to provide a cooled mirror which mitigates distortions due to hydraulic loads introduced by coolant flowing through the heat exchanger.

A still further object of the present invention is the provision of a cooled mirror with optical coatings on each side so as to increase both the flexibility and reliability of the optical system in which the cooled mirror is installed.

To accomplish the foregoing and other objectives, the present invention contemplates providing a compensating backplate or manifold in a backside of the mirror substrate.

It is changes in ambient temperature that cause the bending associated with the bi-material effect. A heat exchanger is provided in the backplate attached to the substrate which is equivalent to the heat exchanger in the faceplate in terms of size and coolant flow rates. Any changes in ambient temperatures will cause the backplate to produce bending effects equal and opposite to those produced by the faceplate. In addition, the hydraulic loads introduced to the cooled mirror system by the heat exchangers in the faceplate and backplate will be equal and opposite to one another. The result is an effectively cooled mirror with greatly reduced bending occasioned by changes in the ambient temperature.

By adding optical coatings to both the frontplate and the backplate both surfaces of the mirror can be used when the substrate is made rotatable.

DETAILED DESCRIPTION OF THE PREFERRED EMBODIMENT

Figure 1:
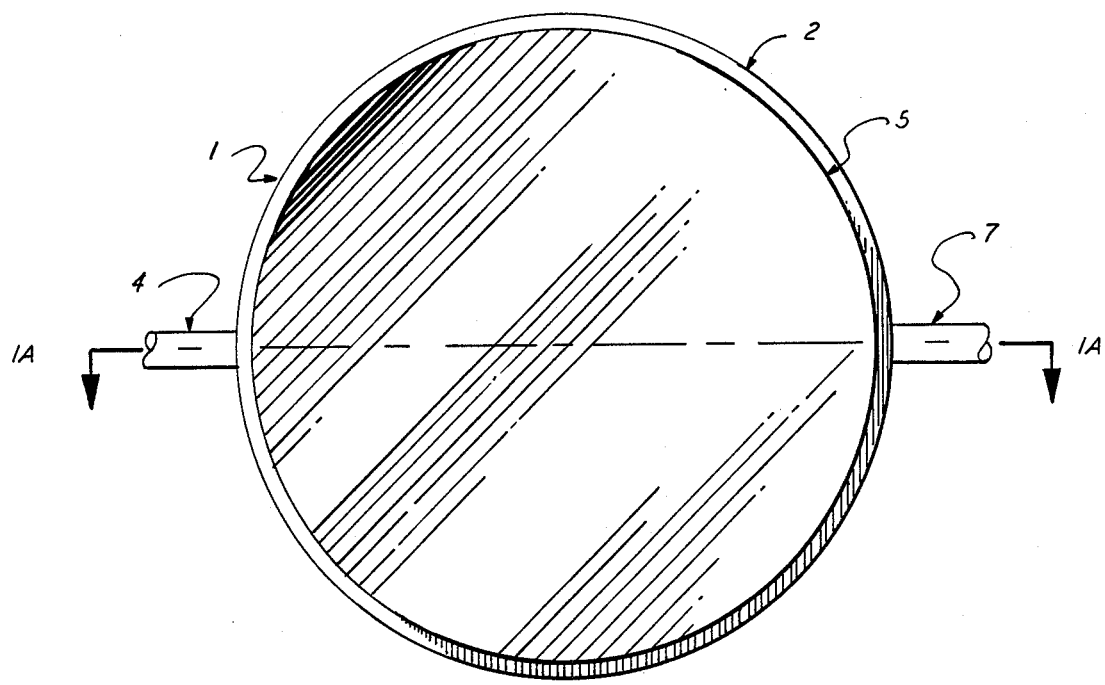
FIG. 1 is a top view of a cooled mirror showing the substrate, faceplate and coolant inlet and outlet.

FIG. 1 is a plan view of a cooled mirror 1 which consists of a substrate 2, first optical surface 5 and coolant inlet 4 and outlet 7.

Figure 1A:
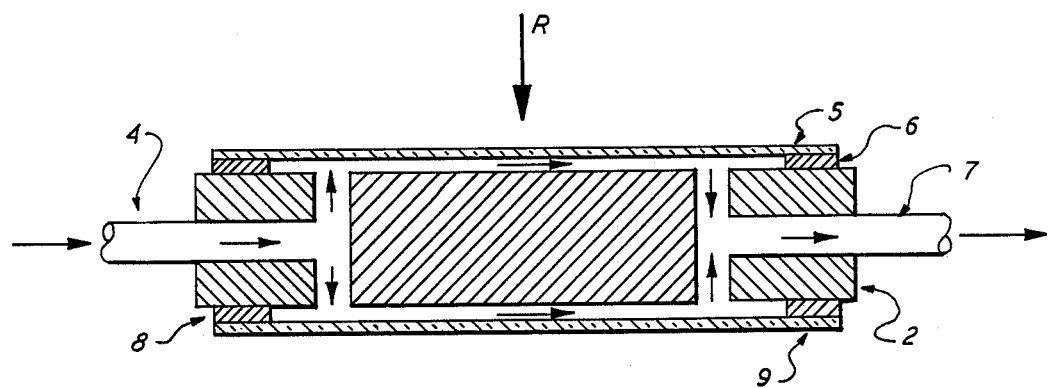
FIG. 1A is a side section view taken through line 1A—1A of the cooled mirror of FIG. 1 with a compensating backplate.

FIG. 1A is a cut away sideview of the cooled mirror of FIG. 1. In addition to the substrate 2, first optical surface 5 and coolant inlet 4 and outlet 7 shown in FIG. 1, FIG. 1A shows the heat exchanger backplate 8, heat exchange-faceplate 6, and second optical surface 9 details of the coolant flow through the manifold in the substrate 2.

The substrate 2 is of any low expansion material sufficiently stiff to hold the faceplate and backplate substantially free of mechanical distortion during operation of the mirror. An appropriate material would, for example, be Ule glass.

The material selected for the faceplate 6 and the backplate 8 is different from that used for the substrate 2 and should have high thermal conductivity so as to maximize the flow of heat to the coolant. The preferred embodiment of the present invention calls for the use of silicon for the faceplate 6 and the backplate 8.

The first optical surface 5 determines the optical character of the system. For example, a reflective coating may be chosen to produce a mirror. The surface chosen must be of such a material, thickness and configuration that it does not interfere with the heat transfer characteristics of the faceplate. One such surface that would meet these requirements would be a dielectrically enhanced metal coating.

The backplate 8 is identical in size to the faceplate 6 and is bonded symmetrically to the opposite side of the substrate 2. The backplate 8 contains a heat exchanger equivalent to that contained in the frontplate 6 in terms of size, coolant flow rates and design pressure.

The result of such a mirror configuration, with thermally and hydraulically equal and opposite frontplate and backplate heat exchangers, is to introduce equal and opposite bending stresses into the mirror 1. These bending stresses can take two forms: bimaterial bending stress and bending stress induced by hydraulic loads in the heat exchangers.

Bimaterial bending is a known phenomenon which occurs whenever two dissimilar materials, joined together, experience ambient temperature changes. Different temperature coefficients of expansion of the materials cause the device made by their joining to bend or curl when the temperature changes. For example, if a faceplate 6 were joined to a substrate 2 without a backplate 8, changes in the ambient temperature would cause the entire mirror 1 to bend or curl. By adding a backplate 8 to the substrate 2, which is equal in size to the faceplate 6, any changes in ambient temperature will cause equal and opposite bimaterial bending stresses to be introduced by the faceplate 6 and backplate 8 joined to the substrate 2. These two bimaterial bending stresses will effectively cancel each other thus reducing distortions to the first optical surface 5 which may have been introduced by bimaterial bending.

In a manner similar to the balancing of bimaterial bending stresses any hydraulic loads introduced by the coolant flowing through the faceplate 6 will be balanced by equal and opposite hydraulic loads caused by coolant flowing through the backplate 8.

The faceplate 6 contains a fluid cooled heat exchanger that removes absorbed laser radiation and insulates the substrate from thermal gradients.

The cooled mirror 1 can be rotatably mounted in any convenient manner, not shown. In this embodiment a second optical surface 9 is added to the backplate 8. Thus, the cooled mirror 1 can be rotated so that the radiation, shown as "R"incident on the first optical surace 5, can be made incident on the second optical surface 9. The characteristics of the second optical surface 9 are the same as those described in reference to the first optical surface 5.

It can thus be appreciated by those skilled in the art that the present invention provides a new and improved high power mirror with low thermal gradients, low distortion due to ambient temperature changes and low distortion due to hydraulic loads placed on the mirror by coolant flows. Because the frontplate and the backplate are identical optical coatings can be placed on each and the mirror made rotatable. This allows for the use of both sides of the cooled mirror in an optical system providing greater flexibility and enhanced reliability.

Having thus described the invention with particular reference to the preferred forms thereof, it will be obvious to those skilled in the art to which the invention pertains, after understanding the invention that various changes and modifications may be made therein without departing from the spirit and scope of the invention, as defined by the claims appended hereto.

What is claimed is:

1. A mirror with compensating means to eliminate bending stresses induced by changes in ambient temperature comprising:

a substrate, of a first material, having a first side and a second side;

a rigid faceplate, of a second material having a higher thermal conductivity and higher thermal coefficient of expansion than said first material, disposed substantially free of stress on said first side of said substrate;

a first optical surface disposed on said faceplate;

a rigid backplate, of said second material, disposed substantially free of stress on said second side of said substrate and being located symmetrical with said faceplate;

said faceplate and said backplate being substantially the same size such that bending stresses in said faceplate induced by a change in ambient temperature are offset by said backplate;

said faceplate containing a first integral fluid cooled heat exchanger;

said backplate containing a second integral fluid cooled heat exchange symmetrical to said first heat exchanger;

a fluid inlet positioned at one end of said substrate and coupled to said first and second heat exchangers;

means, associated with said first and second heat exchangers, for equally dividing fluid flow from said inlet between said first and second heat exchangers whereby hydraulic loads and the thermodynamic cooling caused by said cooling fluid flow are equal to one another; and a fluid outlet positioned at another end of said substrate opposite said inlet.

2. A cooled mirror with a compensating backplate as claimed in claim 1 which further comprises:

a second optical surface disposed on said backplate; and means to rotate said substrate.

* * * * *